United States Patent
Weyer, Jr. et al.

(10) Patent No.: US 10,677,461 B2
(45) Date of Patent: Jun. 9, 2020

(54) ADJUSTABLE BURNER CONTROL VALVE

(71) Applicant: EMERSON PROCESS MANAGEMENT REGULATOR TECHNOLOGIES, INC., McKinney, TX (US)

(72) Inventors: Thomas L. Weyer, Jr., Frisco, TX (US); Madhusudhan Reddy Kotragouda Basappa, Frisco, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 359 days.

(21) Appl. No.: 15/291,831

(22) Filed: Oct. 12, 2016

(65) Prior Publication Data
US 2017/0102145 A1    Apr. 13, 2017

Related U.S. Application Data

(60) Provisional application No. 62/240,043, filed on Oct. 12, 2015.

(51) Int. Cl.
*F23N 1/00* (2006.01)
*F16K 31/383* (2006.01)

(52) U.S. Cl.
CPC ............ *F23N 1/007* (2013.01); *F16K 31/383* (2013.01); *F23D 2208/00* (2013.01); *F23N 2225/14* (2020.01); *F23N 2235/16* (2020.01); *F23N 2235/24* (2020.01)

(58) Field of Classification Search
CPC .............................. F23N 1/007; F16K 31/383
See application file for complete search history.

(56) References Cited

U.S. PATENT DOCUMENTS

| | | | |
|---|---|---|---|
| 2005/0081920 A1 | 4/2005 | Rimondo et al. | |
| 2006/0292505 A1 | 12/2006 | Giacomelli | |
| 2012/0160186 A1* | 6/2012 | Turrin | F23N 1/005 122/14.21 |
| 2017/0023150 A1* | 1/2017 | Hausmann | F16K 31/0655 |

FOREIGN PATENT DOCUMENTS

| | | |
|---|---|---|
| CN | 1289845 C | 12/2006 |
| CN | 102105729 A | 6/2011 |
| JP | S61231325 A | 10/1986 |

OTHER PUBLICATIONS

Search Report for International application No. PCT/US2016/056489, dated Dec. 20, 2016.
Written Opinion for International application No. PCT/US2016/056489, dated Dec. 20, 2016.
Office Action received in Chinese Application No. 2016/0892188.4 dated Jun. 4, 2019.

* cited by examiner

*Primary Examiner* — Grant Moubry
*Assistant Examiner* — Aaron H Heyamoto
(74) *Attorney, Agent, or Firm* — Marshall, Gerstein & Borun LLP

(57) ABSTRACT

A burner control valve with speed control includes a speed control assembly for metering loading pressure into a loading pressure chamber to prevent pilot light blow out and/or backfire in a downstream burner.

20 Claims, 6 Drawing Sheets

ADJUSTABLE BURNER CONTROL VALVE

FIELD OF THE DISCLOSURE

The disclosure generally relates to burner control valves and more specifically to burner control valves with a speed control mechanism.

BACKGROUND OF THE DISCLOSURE

Fuel-gas burner systems are prevalent in the oil and gas industry. Generally fuel-gas burner systems provide heat for use in a system. For example, heat may be used to treat oil or gas during the refining process. In other systems, heat may be used in a dehydrator to evaporate moisture from a liquid or gas. In yet other systems, the heat itself may be a byproduct of disposing of a gas, such as flaring natural gas at an oil well or at a landfill. In some cases, the supply of fuel gas to the burner (or flare) is controlled by a Burner Management System (BMS) that determines when to start or stop the burner. The BMS sends control signals to a control valve to begin and end the supply of fuel gas to the burner. Currently, the control valves are pneumatically operated. Pneumatic control valves are used because of their responsiveness to the control signals. More specifically, pneumatic control valves open and close very quickly. However, one problem with pneumatic control valves is that the full fuel-gas pressure from the supply of fuel gas is provided to the burner very quickly, which can result in extinguishing of a pilot light or, in some cases, a backfire.

SUMMARY OF THE DISCLOSURE

A burner control valve with speed control includes a speed control assembly for metering loading pressure into a loading pressure chamber to prevent pilot light blow out and/or backfire in a downstream burner.

Figure 1:
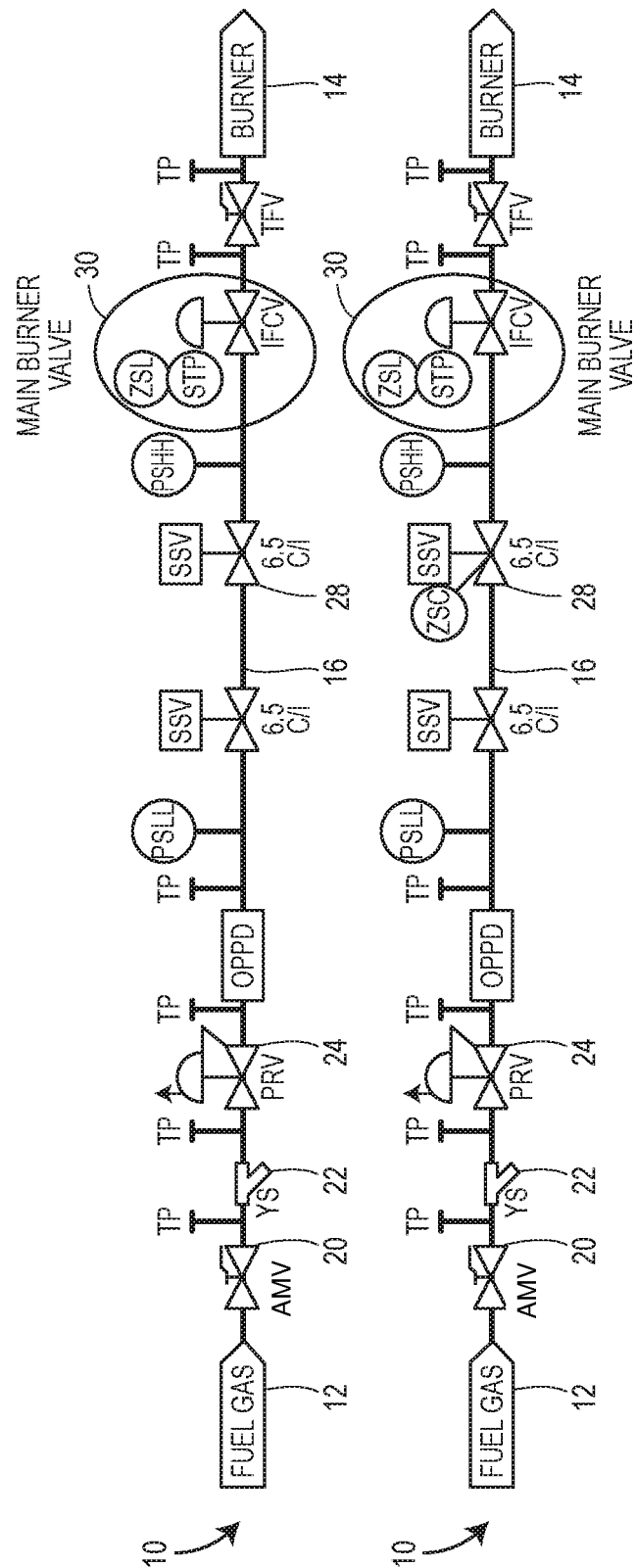
FIG. 1 is a schematic representation of a fuel-gas burner system.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Turning now to FIG. 1, two fuel-gas burner systems 10 are schematically illustrated. Fuel-gas burner systems 10, such as the systems illustrated in FIG. 1, may be used in the oil and gas industry, or for other industrial uses. For example, such fuel-gas burner systems 10 may be used in heating systems, in dehydrating systems, in flare control systems, or any other system that requires a precise supply of gas to a burner. The fuel-gas burner systems may generally include a source of fuel gas 12 that is connected to a burner 14 by a pipeline 16 or other gas carrying mechanism.

The fuel-gas burner systems 10 may include various valves and sensors in the pipeline 16 between the source of fuel gas 12 and the burner 14. For example, the fuel-gas burner systems 10 may include one or more of a main valve 20, a y-strainer 22, a pressure reducing regulator 24, a safety shutoff valve 26 and a main burner valve 30. The adjustable burner control valve disclosed herein takes the place of the main burner valve 30.

Figure 2:
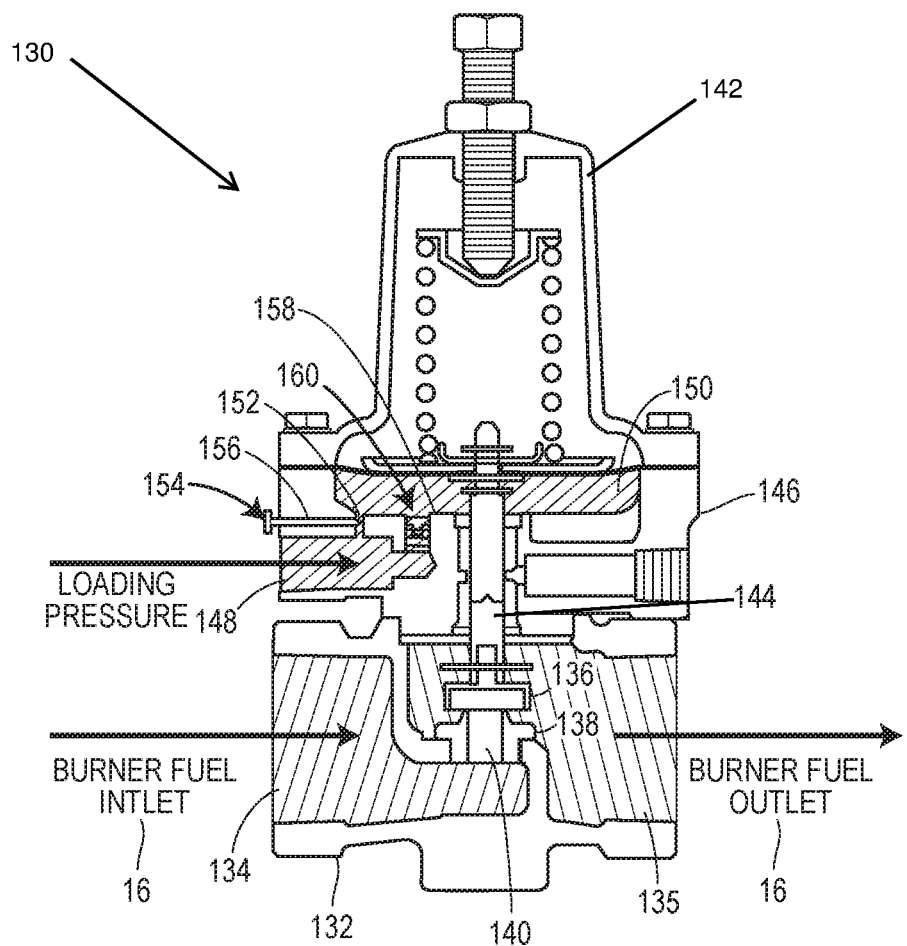
FIG. 2 is a cross-sectional view of one embodiment of an adjustable burner control valve.

Turning now to FIG. 2, one embodiment of an adjustable burner control valve 130 is illustrated. The adjustable burner control valve 130 includes a valve body 132 having a gas inlet 134 and a gas outlet 135. A control element, such as a valve plug 136 cooperates with a valve seat 138 in an orifice 140 between the gas inlet 134 and the gas outlet 135 to control the flow of burner fuel gas through the adjustable burner control valve 130. The valve plug 136 is connected to an actuator 142 by a valve stem 144. The actuator 142 is connected to the valve body 132 by a bonnet 146. The bonnet 146 includes a loading pressure input 148 and a loading chamber 150.

In operation, the actuator 142 biases the valve plug 136 to a closed position in which the valve plug 136 and the valve seat 138 cooperate to prevent burner fuel from flowing from the gas inlet 134 to the gas outlet 135. When burner fuel is needed at the burner 14 (FIG. 1), loading pressure is sent to the loading pressure input 148 from a valve (not shown) upstream of the loading pressure input 148. The loading pressure input 148 is connected to a source of loading pressure, such as the pipeline 16. In this example, burner fuel upstream of the adjustable burner control valve 130 is tapped to provide a source of loading pressure. In other examples, the source of loading pressure may be distinct from the supply of burner fuel. Regardless, the loading pressure gas travels through the loading pressure input 148, and through a speed control conduit 152, into the loading pressure chamber 150. As pressure builds in the loading pressure chamber 150, the pressure opposes the normal actuator force that biases the valve plug 136 to the closed position, and the valve plug 136 begins to move away from the valve seat 138, which results in burner fuel passing through the adjustable burner control valve 130 to the burner 14 (FIG. 1).

Figure 3:
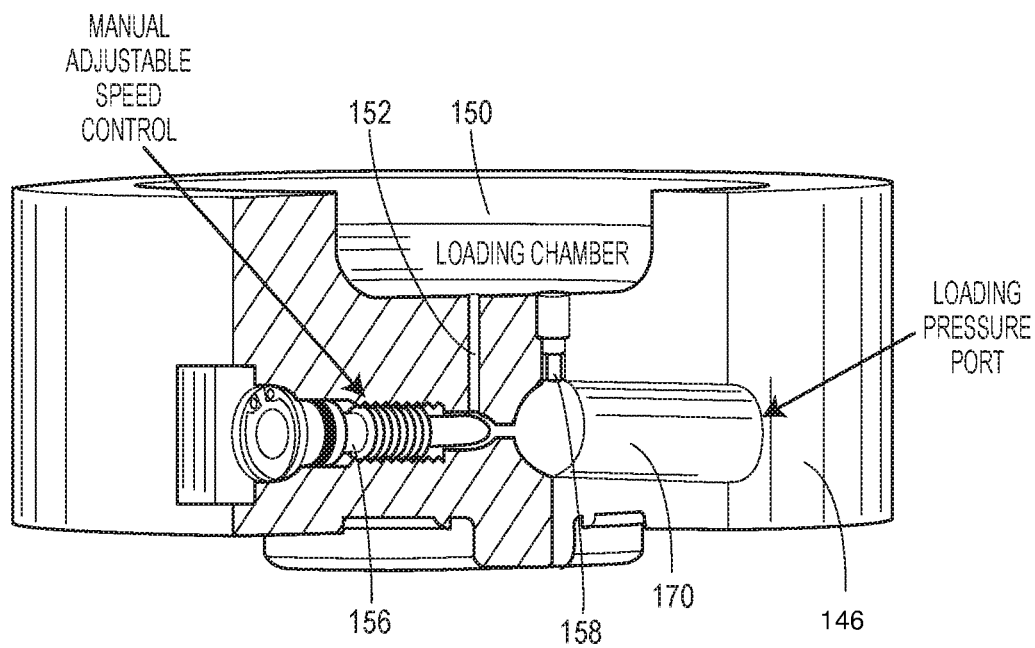
FIG. 3 is a close up view of a bonnet of the adjustable burner control valve of FIG. 2.
Figure 4:
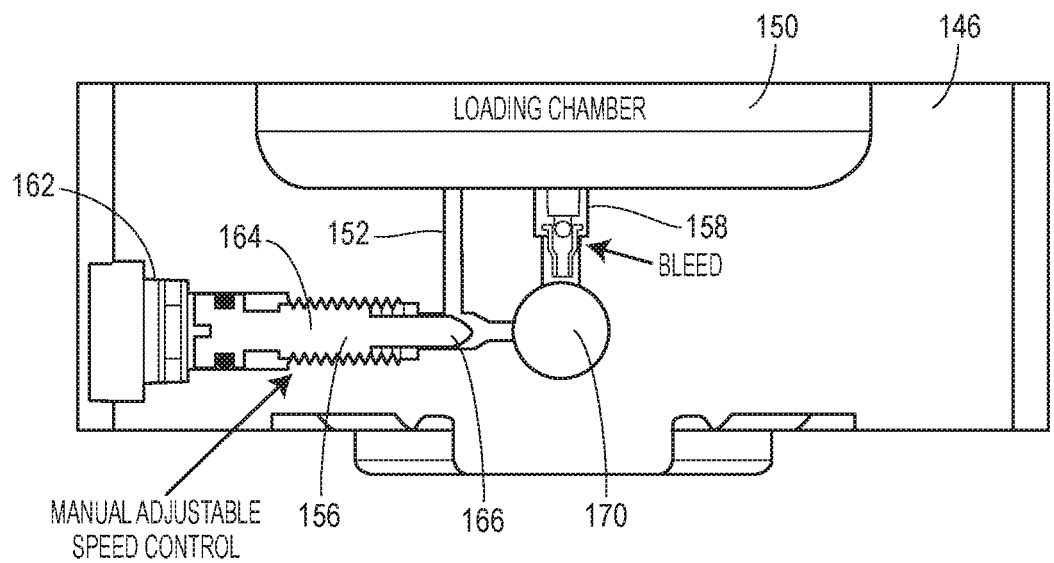
FIG. 4 is a cross-sectional view of the bonnet of FIG. 3.

In the embodiment illustrated in FIGS. 2-4, a speed control assembly 154 meters the loading pressure into the loading pressure chamber 150 at a desired rate. For example, the speed control assembly 154 may slow the rate of gas transfer into the loading pressure chamber 150 so that the valve plug 136 moves away from the valve seat 138 at a slower rate, which slows the initial supply of fuel gas to the burner. As a result, pilot light blow outs and backfires can be reduced or prevented.

In the embodiment illustrated in FIGS. 2-4, the speed control assembly 154 includes the speed control conduit 152, a speed control pin 156, a bleed conduit 158 and a bleed check valve 160. The speed control pin 156 may include a control head 162, a threaded body 164 and a metering tip 166. The control head 162 may include a tool receptacle, such as a screwdriver slot or a wrench head so that the speed control pin 156 may be rotated in the bonnet to open and close a speed orifice 168 located between a loading pressure manifold 170 and the speed control conduit 158. The loading pressure manifold 170 is fluidly connected to the loading pressure input 146. By controlling the area of the speed control orifice 168, the speed control pin 156 can be set to meter a desired rate of burner fuel to the loading chamber and thus, control the rate at which the adjustable burner control valve 130 opens.

The bleed conduit 158 and bleed check valve 160 allow pressure in the loading chamber 150 to vent back into the pressure loading manifold 170 when the adjustable burner control valve 130 is closed. The bleed check valve 160 may meter gas from the loading chamber 150 to the pressure loading manifold 170 at a desired rate to prevent the adjustable burner control valve 130 from closing too quickly.

In one embodiment, the bonnet illustrated in FIGS. 2-4 may be retrofitted onto existing burner control valves to transform the existing burner control valves into adjustable burner control valves with speed control.

Figure 5:
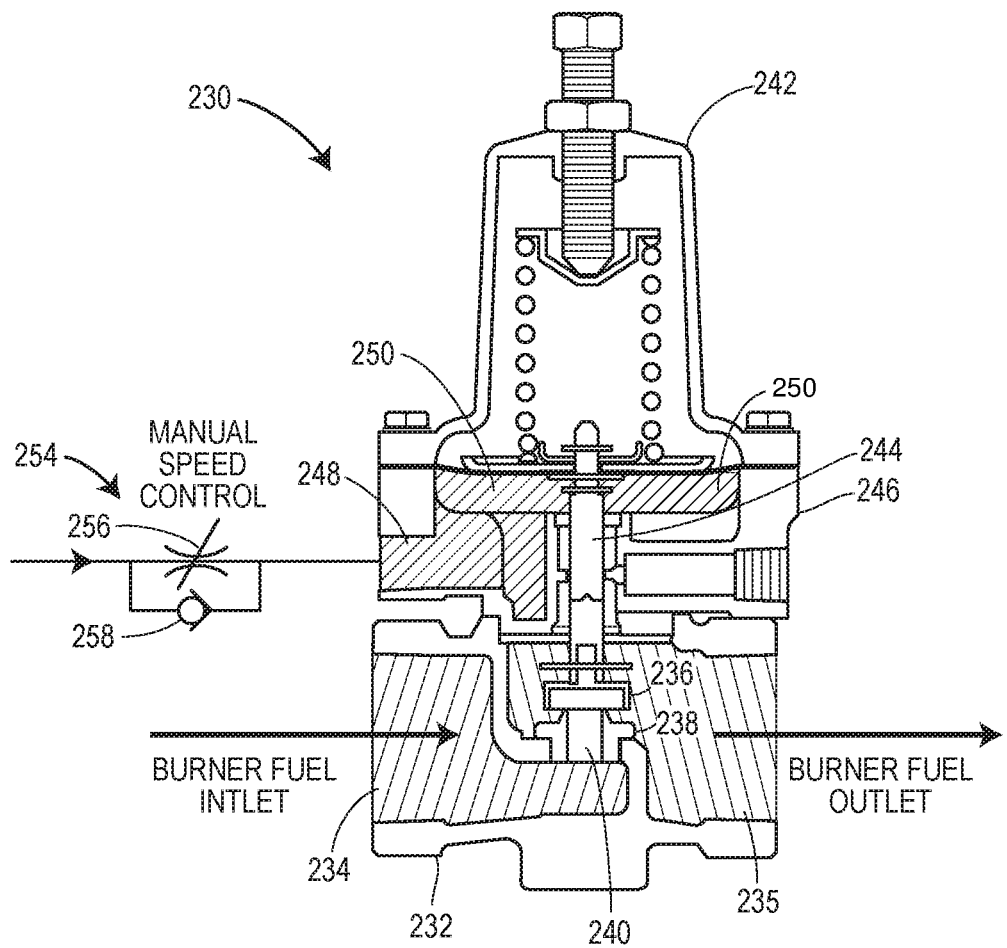
FIG. 5 is a cross-sectional view of a second embodiment of an adjustable burner control valve.

Turning now to FIG. 5, an alternate embodiment of an adjustable burner control valve 230 is illustrated. The adjustable burner control valve 230 illustrated in FIG. 5 includes many similar parts to the adjustable burner control valve 130 illustrated in FIGS. 2-4 Like parts are identified with like reference numerals, the difference being the reference numerals in FIG. 5 are exactly one hundred greater than the reference numerals in FIGS. 2-4.

The adjustable burner control valve 230 illustrated in FIG. 5 includes a valve body 232 having a gas inlet 234 and a gas outlet 235. A control element, such as a valve plug 236 cooperates with a valve seat 238 in an orifice 240 between the gas inlet 234 and the gas outlet 235 to control the flow of burner fuel gas through the adjustable burner control valve 230. The valve plug 236 is connected to an actuator 242 by a valve stem 244. The actuator 242 is connected to the valve body 232 by a bonnet 246. The bonnet 246 includes a loading pressure input 248 and a loading chamber 250.

In contrast to the embodiment illustrated in FIGS. 2-4, the adjustable burner control valve 230 illustrated in FIG. 5 includes a speed control assembly 254 located upstream of the loading pressure input 248. The speed control assembly 254 may include a manual speed control 256 and a bypass check valve 258. The manual speed control 256 and the bypass check valve 258 may operate in a manner similar to the speed control pin 156 and the bleed check valve 160 of the embodiment illustrated in FIGS. 2-4.

The embodiment illustrated in FIG. 5 advantageously allows an existing burner control valve to be transformed into an adjustable burner control valve with speed control by adding the speed control assembly 254 upstream of the loading pressure input 258.

Figure 6:
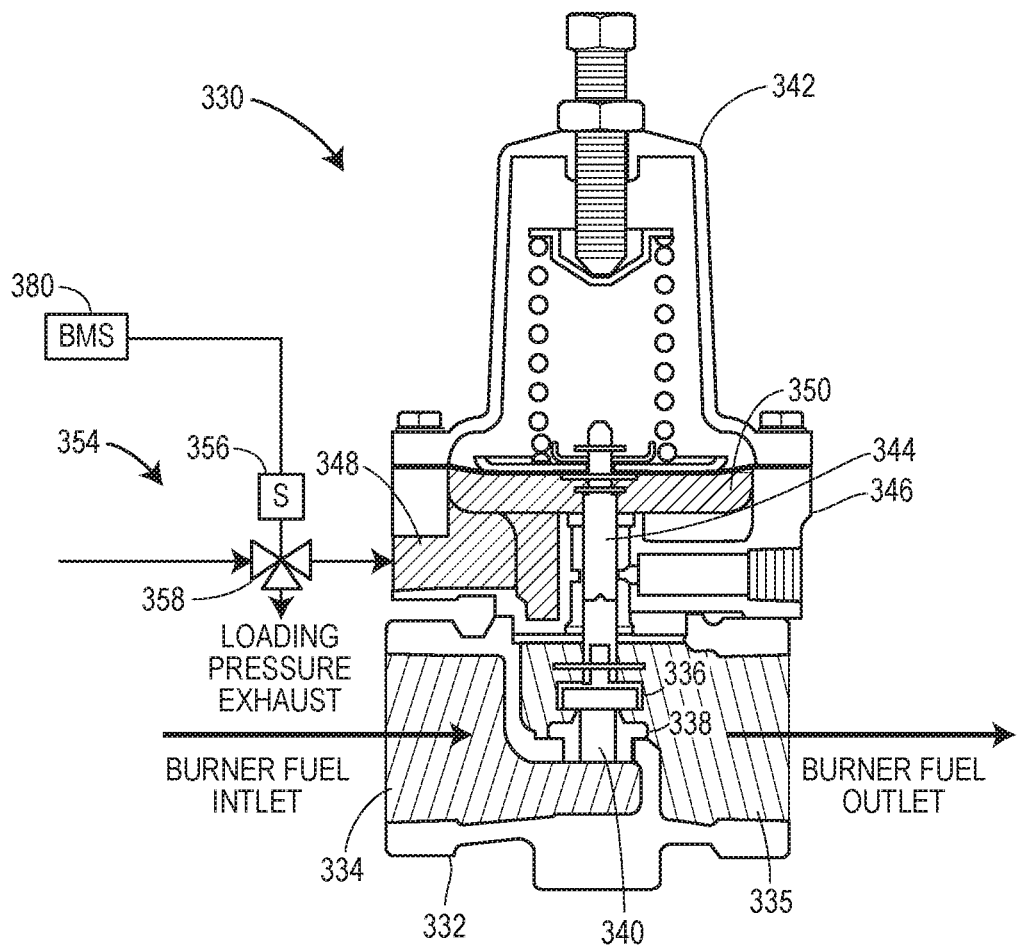
FIG. 6 is a cross-sectional view of a third embodiment of an adjustable burner control valve.

Turning now to FIG. 6, another alternate embodiment of an adjustable burner control valve 330 is illustrated. The adjustable burner control valve 330 illustrated in FIG. 6 includes many similar parts to the adjustable burner control valves 130, 230 illustrated in FIGS. 2-5. Like parts are identified with like reference numerals, the difference being the reference numerals in FIG. 6 are exactly one hundred greater than the reference numerals in FIG. 5.

The adjustable burner control valve 330 illustrated in FIG. 6 includes a valve body 332 having a gas inlet 334 and a gas outlet 335. A control element, such as a valve plug 336 cooperates with a valve seat 338 in an orifice 340 between the gas inlet 334 and the gas outlet 335 to control the flow of burner fuel gas through the adjustable burner control valve 330. The valve plug 336 is connected to an actuator 342 by a valve stem 344. The actuator 342 is connected to the valve body 332 by a bonnet 346. The bonnet 346 includes a loading pressure input 348 and a loading chamber 350.

In contrast to the embodiment illustrated in FIGS. 2-4, the adjustable burner control valve 330 illustrated in FIG. 6 includes a speed control assembly 354 located upstream of the loading pressure input 348. The speed control assembly 354 may include a solenoid 356 and a control valve 358. The solenoid 356 may be communicatively connected to a Burner Management System (BMS) 380. The BMS 380 sends control signals to the solenoid 356 based on the needs of the burner. The solenoid 356 opens and closes the control valve 358 based on the control signals from the BMS 380. The solenoid 356 may have a set opening and/or closing speed to control the rate at which loading pressure is applied to the loading pressure chamber 350. In other embodiments, the speed control assembly 354 of the embodiment of FIG. 6 may be combined with the speed control assemblies 154, 254 illustrated in FIGS. 2-5.

The embodiment illustrated in FIG. 6 advantageously allows an existing burner control valve to be transformed into an adjustable burner control valve with speed control by adding the speed control assembly 354 upstream of the loading pressure input 358.

Figure 7:
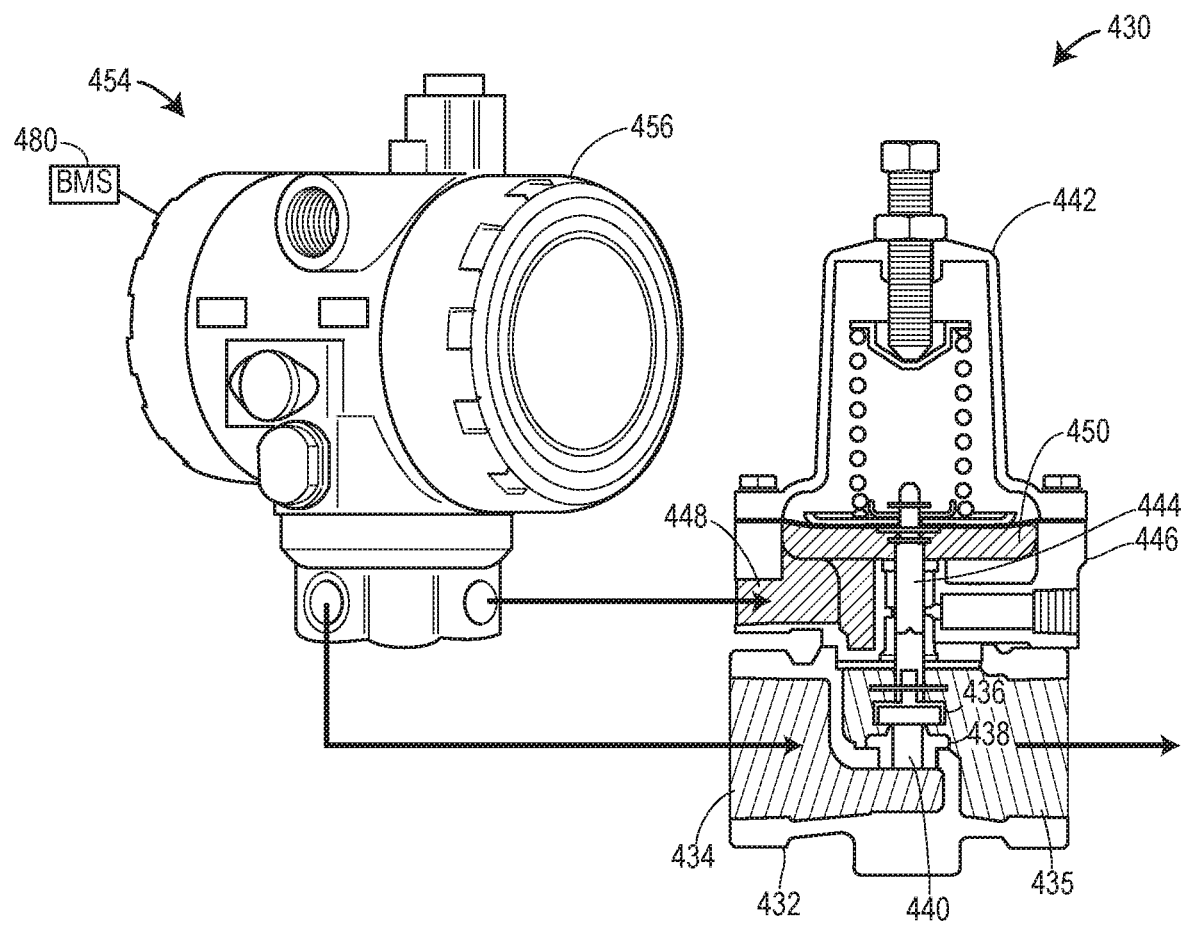
FIG. 7 is a cross-sectional view of a fourth embodiment of an adjustable burner control valve.

Turning now to FIG. 7, another alternate embodiment of an adjustable burner control valve 430 is illustrated. The adjustable burner control valve 430 illustrated in FIG. 7 includes many similar parts to the adjustable burner control valves 130, 230, 330 illustrated in FIGS. 2-6. Like parts are identified with like reference numerals, the difference being the reference numerals in FIG. 7 are exactly one hundred greater than the reference numerals in FIG. 6.

The adjustable burner control valve 430 illustrated in FIG. 6 includes a valve body 432 having a gas inlet 434 and a gas outlet 435. A control element, such as a valve plug 436 cooperates with a valve seat 438 in an orifice 440 between the gas inlet 434 and the gas outlet 435 to control the flow of burner fuel gas through the adjustable burner control valve 430. The valve plug 436 is connected to an actuator 442 by a valve stem 444. The actuator 442 is connected to the valve body 432 by a bonnet 446. The bonnet 446 includes a loading pressure input 448 and a loading chamber 450.

In contrast to the embodiment illustrated in FIGS. 2-4, the adjustable burner control valve 430 illustrated in FIG. 7 includes a speed control assembly 454 located upstream of the loading pressure input 448. The speed control assembly 454 takes the form of an electro-pneumatic transducer 456. The electro-pneumatic transducer 356 may be communicatively connected to a Burner Management System (BMS) 480. The BMS 480 sends control signals to the electro-pneumatic transducer 456 based on the needs of the burner. The electro-pneumatic transducer 456 opens and closes an integrated control valve based on the control signals from the BMS 380. The electro-pneumatic transducer 456 may have a set opening and/or closing speed to control the rate at which loading pressure is applied to the loading pressure chamber 450. In other words, the electro-pneumatic transducer 456 combines the functions of the solenoid 356 in FIG. 6 and the manual speed control assemblies 154, 254 illustrated in FIGS. 2-5.

The embodiment illustrated in FIG. 7 advantageously allows an existing burner control valve to be transformed into an adjustable burner control valve with speed control by adding the speed control assembly 454 upstream of the loading pressure input 458.

The adjustable burner control valves described herein advantageously provide a control mechanism to prevent the adjustable burner control valve from opening or closing too quickly, which reduces or prevents pilot light blow out and backfires. Additionally, the disclosed adjustable burner control valves also increase safety of the burners and prolong the life of the burners by providing a controlled and smooth start up. Still further, any of the disclosed embodiments may be combined with any of the other disclosed embodiments to produce a more robust adjustable burner control valve system.

Although certain adjustable burner control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A burner control valve comprising:
   a valve body having a gas inlet and a gas outlet connected to one another by an orifice;
   a control element that cooperates with a valve seat to control a flow of gas through the valve body;
   an actuator operatively connected to the control element;
   a bonnet that connects the actuator to the valve body, the bonnet including a loading pressure input and a loading pressure chamber; and
   a speed control assembly configured to control the rate of gas that passes through the loading pressure input into the loading pressure chamber and control the rate at which the burner control valve opens,
   wherein the bonnet is disposed between the valve seat and the actuator.

2. The burner control valve of claim 1, wherein the speed control assembly is located at least partially within the bonnet.

3. The burner control valve of claim 2, wherein the speed control assembly includes a manual speed control element operatively connected to a speed control conduit, the speed control conduit being disposed between the loading pressure input and the loading pressure chamber.

4. The burner control valve of claim 3, wherein the manual speed control element is a speed control pin.

5. The burner control valve of claim 4, wherein the speed control pin includes a control head, a threaded body, and a metering tip.

6. The burner control valve of claim 5, wherein the metering tip is disposed in a metering orifice located between a loading pressure manifold and the speed control conduit.

7. The burner control valve of claim 2, further comprising a bleed conduit located between the loading pressure chamber and the loading pressure input.

8. The burner control valve of claim 7, further comprising a bleed check valve located in the bleed conduit.

9. The burner control valve of claim 1, wherein the speed control assembly is located outside the bonnet.

10. The burner control valve of claim 9, wherein the speed control assembly includes a manual speed control element and a bypass valve.

11. The burner control valve of claim 1, wherein the speed control assembly includes a solenoid.

12. The burner control valve of claim 11, wherein the solenoid is communicatively connected to a burner management system.

13. The burner control valve of claim 1, wherein the speed control assembly includes an electro-pneumatic transducer.

14. The burner control valve of claim 13, wherein the electro-pneumatic transducer is communicatively connected to a burner management system.

15. A burner control valve comprising:
   a valve body having a gas inlet and a gas outlet connected to one another by an orifice;
   a valve seat disposed in the orifice;
   a control element movably disposed within the valve body relative to the valve seat to control a flow of gas through the valve body;
   a bonnet coupled to the valve body;
   an actuator coupled to the bonnet and comprising a diaphragm operatively connected to the control element, wherein the diaphragm is captured between the bonnet and the actuator, and wherein the bonnet includes a loading pressure input and a loading pressure chamber in fluid communication with the diaphragm, the loading pressure input comprising a port formed in an exterior surface of the bonnet; and
   a speed control assembly configured to control the rate of gas that passes through the loading pressure input into the loading pressure chamber and control the rate at which the burner control valve opens.

16. The burner control valve of claim 11, wherein the speed control assembly comprises a bleed conduit disposed between the loading pressure input and the loading chamber, and a bleed check valve located in the bleed conduit and configured to vent pressure in the loading chamber into the loading pressure input when the control element sealingly engages the valve seat.

17. A burner control valve comprising:
   a valve body having a gas inlet and a gas outlet connected to one another by an orifice;
   a valve seat disposed in the orifice;
   a control element movably disposed within the valve body relative to the valve seat to control a flow of gas through the valve body;
   a bonnet coupled to the valve body;
   an actuator coupled to the bonnet and comprising a diaphragm operatively connected to the control element, wherein the diaphragm is captured between the bonnet and the actuator, and wherein the bonnet includes a loading pressure input and a loading pressure chamber in fluid communication with the diaphragm, the loading pressure input having an inlet formed in an exterior surface of the bonnet; and
   a speed control assembly coupled to the bonnet, the speed control assembly comprising a speed control conduit disposed between the loading pressure input and the loading pressure chamber, a speed orifice disposed between the speed control conduit and the loading pressure input, and a speed control pin rotatably disposed in the bonnet relative to the speed orifice to control the rate of gas that passes from the loading pressure input and into the loading pressure chamber via the speed control conduit.

18. The burner control valve of claim 13, wherein the speed control assembly further comprises a loading pressure manifold fluidly connected to the loading pressure input, a bleed conduit disposed between the loading pressure manifold and the loading chamber, and a bleed check valve located in the bleed conduit and configured to vent pressure in the loading chamber into the pressure loading manifold when the control element sealingly engages the valve seat.

19. The burner control valve of claim 1, wherein when the speed control assembly is in a first position, the speed control assembly permits a first rate of gas to pass through the loading pressure input into the loading pressure chamber, and wherein when the speed control assembly is in a second position different from the first position, the speed control assembly permits a second rate of gas to pass through the loading pressure input into the loading pressure chamber, the first rate of gas being greater than zero and the second rate of gas being greater than the first rate of gas.

20. The burner control valve of claim 1, wherein the speed control assembly is movable to slow the rate of gas that passes through the loading pressure input into the loading pressure chamber, such that the control element is movable away from the valve seat at a slower rate.

\* \* \* \* \*

UNITED STATES PATENT AND TRADEMARK OFFICE
CERTIFICATE OF CORRECTION

| | |
|---|---|
| PATENT NO. | : 10,677,461 B2 |
| APPLICATION NO. | : 15/291831 |
| DATED | : June 9, 2020 |
| INVENTOR(S) | : Thomas L. Weyer, Jr. et al. |

Page 1 of 1

It is certified that error appears in the above-identified patent and that said Letters Patent is hereby corrected as shown below:

In the Drawings

At FIG. 2, Sheet 2 of 6, reference character "16", "INTLET" should be -- INLET --.

At FIG. 5, Sheet 4 of 6, in Line 5, reference character "234", "INTLET" should be -- INLET --.

At FIG. 6, Sheet 5 of 6, in Line 5, reference character "334", "INTLET" should be -- INLET --.

In the Specification

At Column 3, Line 4, "pressure input 146." should be -- pressure input 148. --.

At Column 3, Line 25, "FIGS. 2-4" should be -- FIGS. 2-4. --.

At Column 4, Line 27, "pressure input 358." should be -- pressure input 348. --.

At Column 4, Line 53, "electro-pneumatic transducer 356" should be -- electro-pneumatic transducer 456 --.

In the Claims

At Column 6, Line 29, "claim 11," should be -- claim 15, --.

At Column 6, Line 62, "claim 13," should be -- claim 17, --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*